United States Patent [19]

Higashihara

[11] Patent Number: 5,012,267

[45] Date of Patent: Apr. 30, 1991

[54] FOCUS ADJUSTING APPARATUS

[75] Inventor: Masaki Higashihara, Yokohama, Japan

[73] Assignee: Canon Kabushiki Kaisha, Tokyo, Japan

[21] Appl. No.: 519,251

[22] Filed: May 2, 1990

Related U.S. Application Data

[63] Continuation of Ser. No. 259,783, Oct. 19, 1988, abandoned.

[30] Foreign Application Priority Data

Oct. 21, 1987 [JP] Japan .................................. 62-263728

[51] Int. Cl.$^5$ .............................................. G03B 13/36
[52] U.S. Cl. ...................................... 354/402; 354/400
[58] Field of Search ............. 354/400, 402, 409, 195.1

[56] References Cited

U.S. PATENT DOCUMENTS

| | | | |
|---|---|---|---|
| 4,783,677 | 11/1988 | Hamada et al. | 354/402 |
| 4,786,932 | 11/1988 | Akashi | 354/402 |
| 4,792,819 | 12/1988 | Akashi | 354/409 |
| 4,792,821 | 12/1988 | Akashi | 354/409 |
| 4,801,962 | 1/1989 | Akashi | 354/403 |
| 4,825,238 | 4/1989 | Akashi | 354/402 |

Primary Examiner—Russell E. Adams
Attorney, Agent, or Firm—Fitzpatrick, Cella, Harper & Scinto

[57] ABSTRACT

A focus adjusting apparatus in which a functional equation representative of the imaging plane position accompanying the movement of an object to be photographed after a predetermined time is found from the result of the past focus detection, and the imaging plane position after the predetermined time is foreseen by means of the functional equation, whereby a lens is driven to the foreseen position.

14 Claims, 11 Drawing Sheets

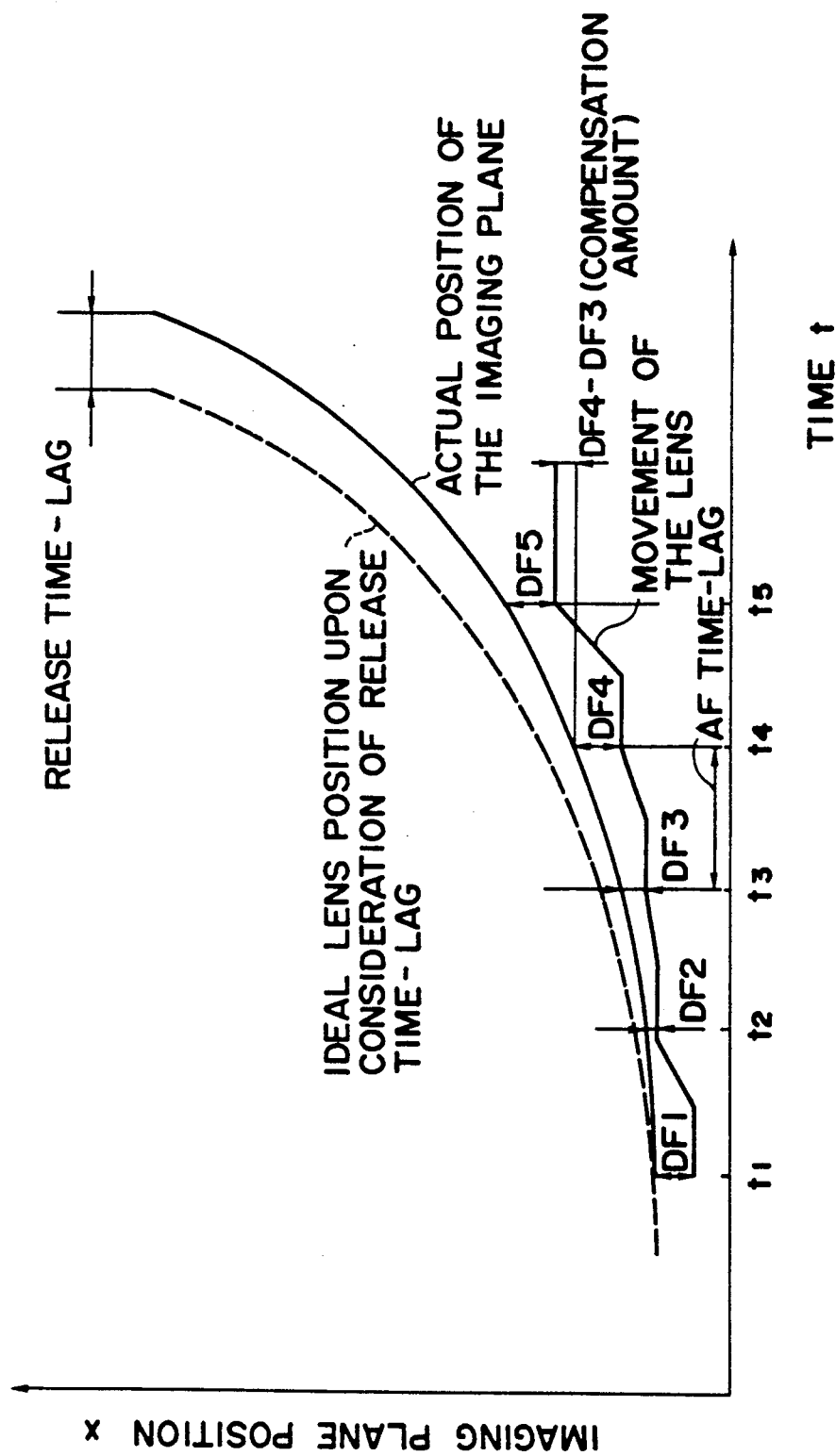

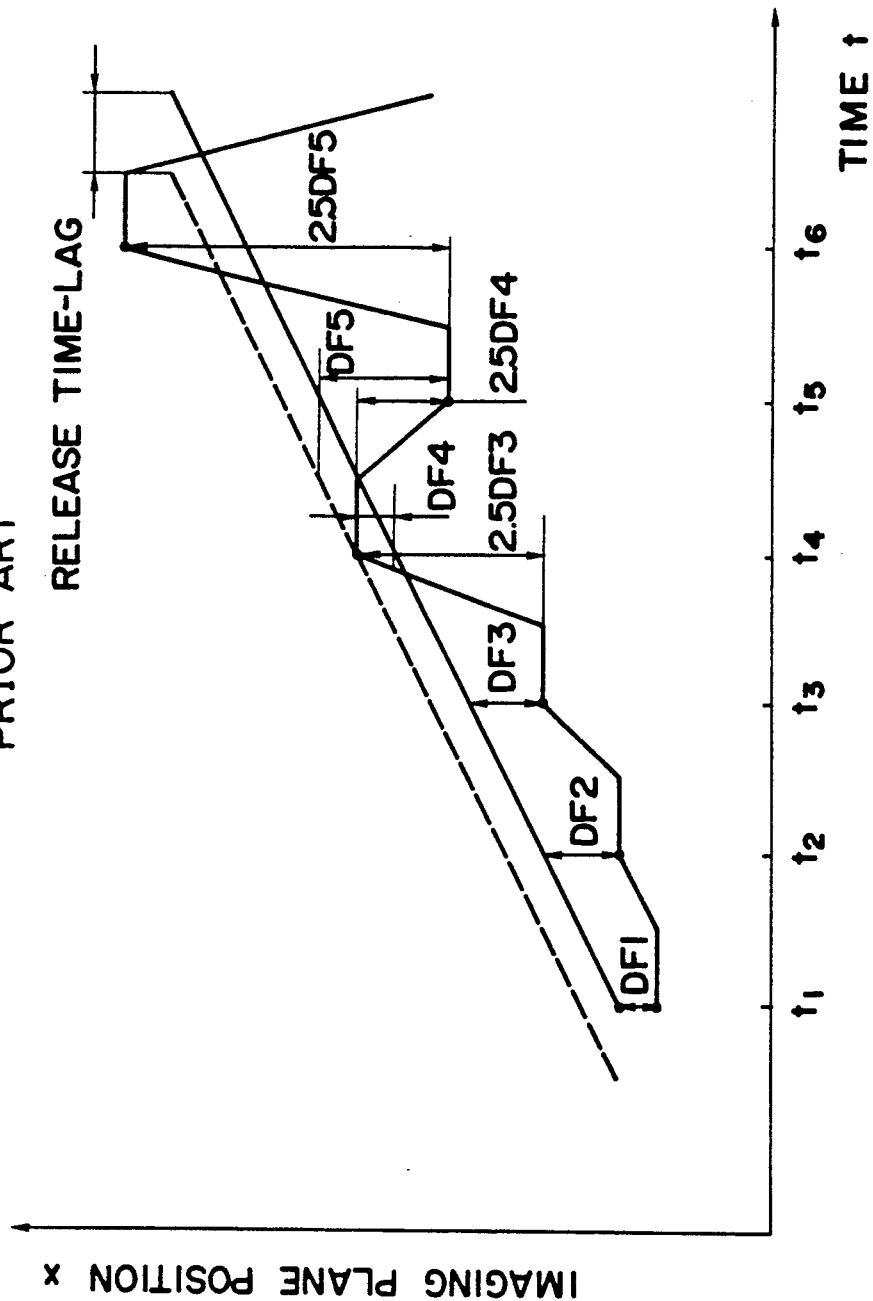

FOCUS ADJUSTING APPARATUS

This application is a continuation of application Ser. No. 259,783 filed Oct. 19, 1988, now abandoned.

BACKGROUND OF THE INVENTION

1. Field of the Invention

This invention relates to improvements in an automatic focus adjusting apparatus for receiving the object light passed, for example, through a photo-taking lens to thereby detect the defocus state of said photo-taking lens and accomplish focus adjustment.

2. Related Background Art

In an apparatus of this type, when effecting the focus adjustment of the photo-taking lens, the amount of defocus has first been detected, and then the lens driving amount has been calculated as shown in the following equation so that the amount of defocus is "0", and lens driving control has been effected on the basis thereof.

Lens driving amount=(amount of defocus)/(sensitivity of lens)

Here, if the distance between an object to be photographed and the camera is constant, focusing can always be continued by effecting the lens driving control as described above. However, during a photographing condition in which the distance between the object to be photographed and the camera is always changing, for example, during a photographing condition in which the object to be photographed is moving toward the camera at a predetermined speed, the distance between the object to be photographed and the camera changes during the time from the start of distance measurement until the completion of lens driving (hereinafter referred to as the AF time-lag) and the lens is out of focus by that amount. Even if the lens has been in focus until that point of time, there has been the disadvantage that the lens is likewise out of focus during the time from the closing of the release switch until the movement of the shutter curtain (hereinafter referred to as the release time-lag). So, apparatuses provided with means for compensating for the follow-up delay by said AF time-lag or said release time-lag are disclosed in Japanese Laid-Open Patent Application Nos. 62-125311, 62-139511 and 62-139512.

The follow-up delay compensating system in the aforementioned propositions will hereinafter be described with reference to FIG. 9(a) of the accompanying drawings. In FIG. 9(a), the ordinate represents the imaging plane position (the imaging plane position of the object to be photographed) and the abscissa represents time.

Here, if the distance between the object to be photographed and the camera changes at all times and the imaging plane position changes as indicated by the solid line in the figure (it assumes the curve as indicated in FIG. 9(a) when the object to be photographed is moving toward the camera at a predetermined speed), the object to be photographed will move during the AF time-lag and out-of-focus of DF2, DF3 and DF4 will always occur. So, if for example, the current amount of defocus DF4 and the preceding amount of defocus DF3 are in the relation that DF4>DF3, it is judged that a follow-up delay is occurring, and the compensation amount is calculated from the following equation:

$$\text{Compensation amount} = DF4 - DF3 \tag{1}$$

However, in the photographing of an ordinary moving object which assumes the curve as indicated in FIG. 9(a), even if the compensation as previously described is effected, a follow-up delay corresponding to the amount of defocus DF5 exists and thus, complete compensation is not effected. Also, during the photographing, the follow-up delay by the release time-lag is added to further increase the amount of defocus. The ideal lens position upon consideration of such release time-lag is indicated by the broken line in the figure, and it is more advanced in phase by an amount corresponding to the release time-lag than the change in the actual position of the imaging plane. Accordingly, if the release operation can be entered at a position on this broken line, the lens will be in focus during the photographing.

Here, as an example in which the follow-up delay by the release time-lag is also compensated for by only the detected amount of defocus DF, the AF time-lag is defined as AFTL, the release time-lag is defined as LETL, the sensitivity of the lens is defined as LB and the lens driving amount DL is considered as $$DL = \frac{(2AFTL + LETL) + DF}{AFTL \times LB} \tag{2}$$

and if on the assumption that $LETL = AFTL/2$, this is substituted into the above equation, the movement of the lens will be as shown in FIGS. 9(b) and 9(c) of the accompanying drawings (FIG. 9(c) shows the time of photographing a moving object differing from that in FIG. 9(b)). That is, the amount of defocus in the same direction as the amounts of defocus DF2 and DF3 is detected, and when the follow-up compensation is judged to be necessary, the follow-up compensation is entered and the lens driving amount is changed to 2.5 DF.

From these figures, it is seen that in FIG. 9(b), the compensation amount is deficient for the ideal position even if such compensation is effected, and in the case of FIG. 9(c), in the first compensation, the ideal position is provided by this compensation. However, in the second and subsequent compensations, a deficient compensation amount or, as shown, a reverse effect (which is due to the fact that the value of the amount of defocus DF4 becomes reverse (positive or negative sign) in direction to the preceding amounts of defocus DF2 and DF3 for the actual position of the imaging plane) is provided and thus, the movement of the lens becomes very unstable and in some cases, there is the danger of the movement of the lens diverging.

With such a system for monitoring and compensating for only the amount of defocus DF, it has been difficult to accomplish ideal lens driving control.

SUMMARY OF THE INVENTION

One aspect of the present invention is to provide an automatic focus adjusting apparatus which can accomplish focusing more precisely even for an object to be focus-detected which is always moving.

Another aspect of the present invention is to provide a focus adjusting apparatus which substitutes the past amount of defocus into an equation representative of the function of the imaging plane position and time to thereby find the imaging plane position after a predetermined time.

A further aspect of the present invention is to provide a focus adjusting apparatus which is provided with memory means for memorizing the past amount of defocus and the lens driving amount for an object to be focus-detected, and foreseeing control means for calculating the past and current imaging plane positions from the amount of defocus and the lens driving amount memorized by said memory means and the current amount of defocus, finding a function approximately representative of the relation between the imaging plane position and time from said past and current imaging plane positions, foreseeing the position of a focus adjusting lens which will come in focus at a predetermined time from now by said function, and calculating the lens driving amount for driving said focus adjusting lens to said foreseen position and outputting it to driving means, whereby the imaging plane position is foreseen on the basis of the past record of the imaging plane position and the position of the focus adjusting lens after the predetermined time upon consideration of the AF time-lag and the release time-lag, and the lens is driven to the foreseen position.

Other objects of the present invention will become apparent from the following detailed description of some embodiments thereof taken in conjunction with the accompanying drawings.

DESCRIPTION OF THE PREFERRED EMBODIMENTS

Figure 1:
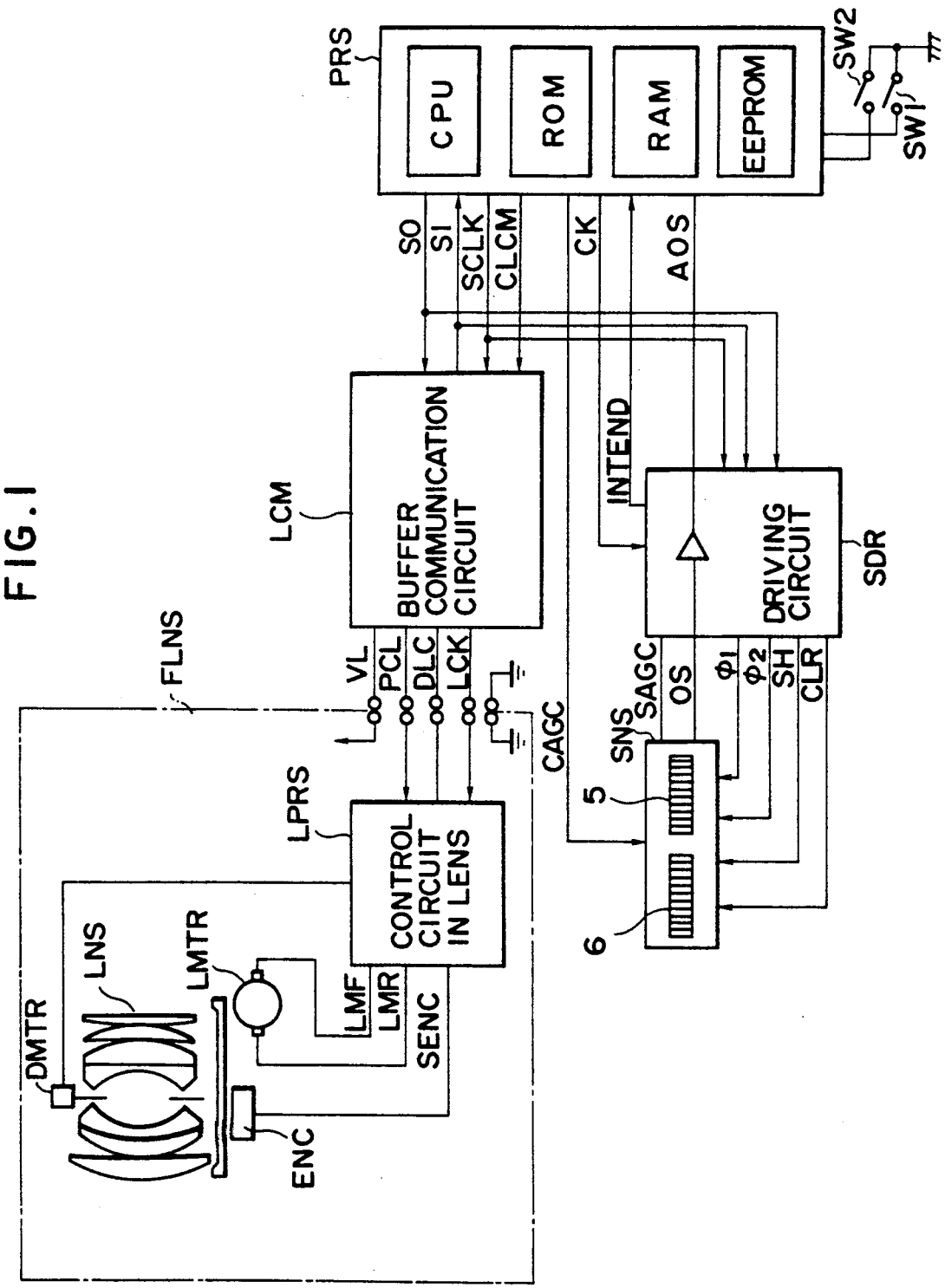
FIG. 1 is a block diagram of the essential part of a camera having an apparatus according to an embodiment of the present invention.

The present invention will hereinafter be described in detail with respect to some embodiments thereof shown in the drawings.

Figure 8:
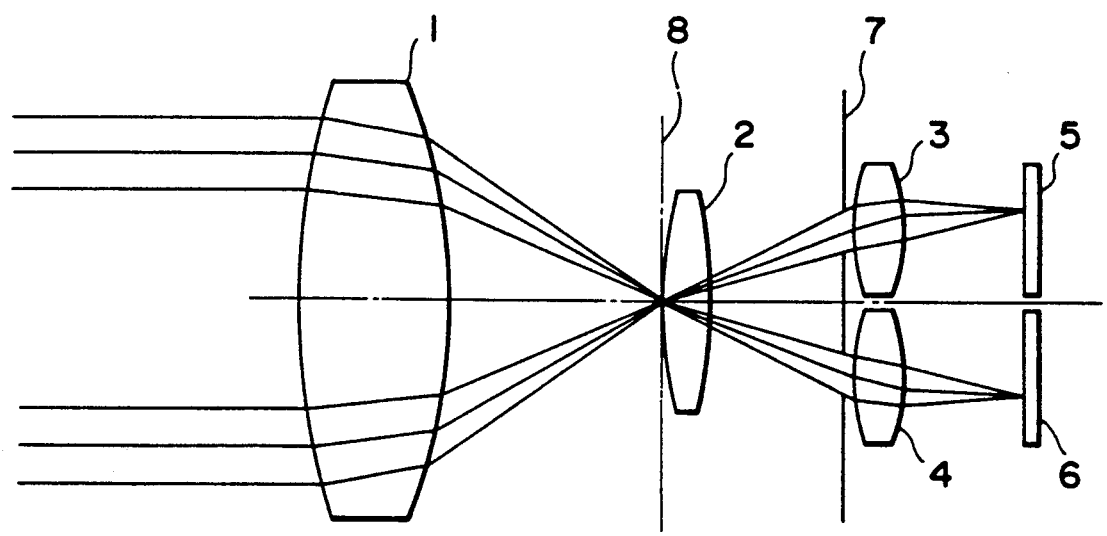
FIG. 8 illustrates a focus detecting system in the apparatus according to the second embodiment.
Figure 9B:
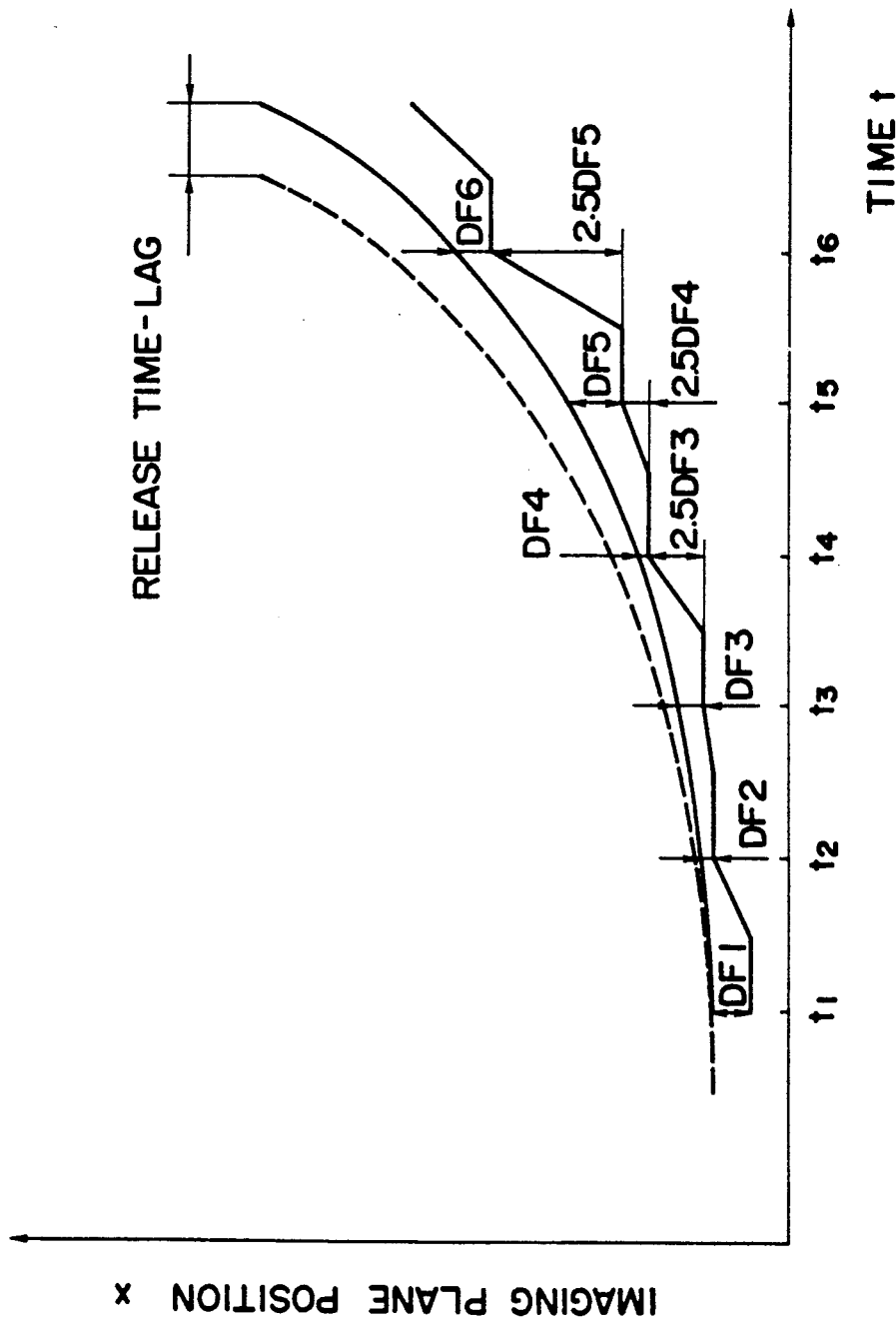
FIGS. 9(a), (b) and (c) illustrate the lens driving control in the prior-art apparatus.

The focus detecting system will first be described with reference to FIG. 8. A field lens 2 is disposed with the same optic axis as a photo-taking lens 1 to be focus-detected. Two secondary imaging lenses 3 and 4 are disposed at positions rearward of the field lens and symmetrical with respect to the optic axis. Sensor arrays 5 and 6 are disposed rearwardly of the secondary imaging lenses. A stop 7 is provided near the secondary imaging lenses 3 and 4, and the field lens 2 substantially images the exit pupil of the photo-taking lens 1 on the pupil planes of the two secondary imaging lenses 3 and 4. As a result, light fluxes entering the secondary imaging lenses 3 and 4 are ones which have emerged from areas of equal sizes on the exit pupil plane of the photo-taking lens 1 which correspond to the secondary imaging lenses 3 and 4 and which do not overlap each other. When an aerial image 8 formed near the field lens 2 is re-imaged on the surface of the sensor arrays 5 and 6 by the secondary imaging lenses 3 and 4, the two images on the sensor arrays 5 and 6 change their positions on the basis of the displacement of the aerial image 8 in the direction of the optic axis. Accordingly, if the displacement of the relative position (the amount of image deviation) is detected, the focus condition of the photo-taking lens 1 can be known.

Said amount of image deviation can be detected by effecting a correlated calculation about the photoelectric conversion outputs (image signals) of the two images formed on the sensor arrays 5 and 6, and such calculating system is disclosed in Japanese Laid-Open Patent Application Nos. 58-142306, 59-107313 and 60-101513. The difference between the focus position of the photo-taking lens 1 and the film surface, i.e., the amount of defocus, is calculated from the amount of image deviation thus obtained.

FIG. 1 is a block diagram schematically showing a camera having the apparatus of the present embodiment provided with the focus detecting system as described above. In FIG. 1, PRS designates the control circuit of the camera which is, for example, a one-chip microcomputer having CPU, ROM, RAM, EEPROM, A/D converting function, etc. therein. The control circuit PRS performs the control of the various operations of the camera such as automatic exposure function, automatic focus function, winding-up and rewinding of the film in accordance with a sequence program stored in the ROM, and communicates with the surrounding circuits and a lens FLNS by the use of SO, SI and SCLK which are signals for communication, and performs the control of the operations of the respective circuits and the lens FLNS. SO is a lens driving data signal output from the control circuit PRS, SI is a data signal input to the control circuit PRS, and SCLK is a synchronizing signal for the data signals SO and SI.

LCM designates a lens communication circuit which provides a power source VL for the lens to the lens side during the operation of the camera and receives an H level (meaning a high level) signal CLCM as an input from the control circuit PRS, whereby it becomes a buffer of the communication between the camera and the lens. Accordingly, when the H level signal CLCM is input from the control circuit PRS and the predetermined data signal SO is supplied in synchronism with the synchronizing signal SCLK, the buffer signals LCK and DCL of said signals SCLK and SO, respectively, are output to the lens FLNS through the contact between the camera and the lens. Simultaneously therewith, the buffer signal of a signal DLC which is the information of the current portions, etc. from the lens FLNS is output as the data signal SI to the control circuit PRS in synchronism with said signal SCLK.

SDR denotes a driving circuit for a line sensor device SNS comprising the sensor arrays 5 and 6 for focus detection, and this driving circuit is selected and controlled by the signals SO and SCLK when a signal CSDR from the control circuit PRS is at H level.

CK designates a clock for producing line sensor driving clocks $\phi_1$ and $\phi_2$, and INTEND is a signal for informing the control circuit PRS that the accumulating operation has been terminated. An output signal OS from the line sensor device SNS is a time-serial image signal synchronized with the clocks $\phi_1$ and $\phi_2$, and it is amplified by an amplifier circuit in the driving circuit SDR, whereafter it is output as a signal AOS to the control circuit PRS. The control circuit PRS receives as an input from an analog input terminal the signal AOS which is said image signal, and A/D-converts it by the A/D converting function therein in synchronism with the clock CK, whereafter the control circuit causes it to be stored in the predetermined address of the RAM. A signal AGC which also is the output signal of the line sensor device SNS is the output of the AGC controlling sensor (not shown) of the line sensor device SNS, and is input to the driving circuit SDR for use for the accumulation control of the line sensor device SNS.

A signal DCL input to a control circuit LPRS in the lens in synchronism with a buffer signal LCK is command data from the camera to the lens FLNS, and the operation of the lens FLNS to the command is predetermined. The control circuit LPRS in the lens analyzes the command in accordance with a predetermined procedure, and effects operations such as focus adjustment and aperture control and the outputting of various parameters (such as open F-number, focal length and count of the amount of defocus vs. the amount of axial movement) from a signal DLC.

An example of the single lens which is totally axially moved is shown in the present embodiment, and when a command for focus adjustment is sent from the camera, a focus adjusting motor LMTR is driven by signals LMF and LMR in accordance with the direction of the amount of driving sent simultaneously therewith to move the photo-taking lens LNS in the direction of the optic axis, thereby accomplishing focus adjustment. The amount of driving of the photo-taking lens LNS is monitored by the pulse signal SENC of an encoder circuit ENC which is operatively associated with the movement of the lens LNS and outputs a number of pulses corresponding to the amount of movement of the lens, and at a point of time whereat a predetermined movement has been completed, the signals LMF and LMR are rendered into L level (meaning a low level) to thereby brake the focus adjusting motor LMTR.

When a command for aperture control is sent from the camera, a conventional stepping motor DMTR is driven for aperture driving in accordance with the number of aperture steps sent simultaneously therewith. The stepping motor can be open-controlled and therefore does not require an encoder for monitoring the operation thereof.

Figure 3:
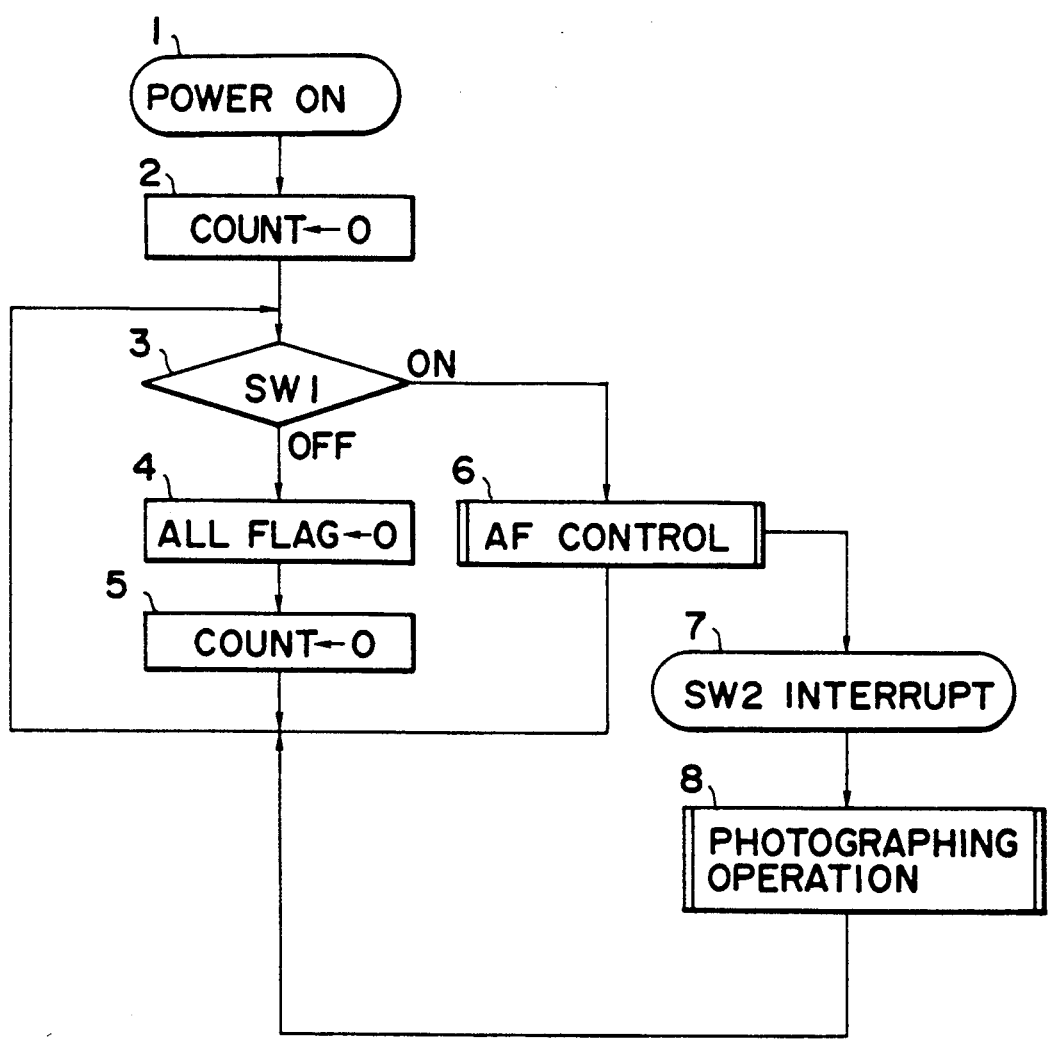
FIG. 3 is a flow chart of the essential part of the camera shown in FIG. 1.

The outline of the operation of the portions of the camera of the above-described construction which are concerned with the present invention will hereinafter be described with reference to the flow-chart of FIG. 3.

When a power source switch, not shown, is closed, the supply of electric power to the control circuit PRS is started and the control circuit PRS starts to execute the sequence program stored in the ROM.

First, at step 2, the content of a counter COUNT for counting the frequency with which AF operation has been performed is set to "0", and an advance is made to step 3. Here, the state of a switch SW1 adapted to be closed by the first stroke operation of a release button is detected, and if the switch SW1 to OFF, an advance is made to step 4, where flags for various controls set in the RAM are all cleared, and an advance is then made to step 5, where the content of the counter COUNT is set to "0".

The operations of the steps 3–5 are repeated until the switch SW1 becomes ON or the power source switch becomes OFF, and by the switch SW1 becoming ON, a shift is made to step 6. The step 6 is an "AF control" sub-routine, and at this step, the AF control operation is executed. When the second stroke operation of the release button is effected in the midst of the AF control operation and a switch SW2 becomes ON, the release operation is started by the interrupt processing function, and the exposure operation, i.e., the control of the aperture and shutter time, is effected, whereafter the shutter charge and the film feeding operation are effected, whereby a photographing operation for one frame of the film is terminated.

The "AF control" sub-routine executed at the step 6 will now be described with reference to FIG. 4.

First, at step 102, the state of a flag PRMV is detected. The flag PRMV is a flag for lens control as will be described later, and during the initial time, all flags are cleared at the step 4 and therefore, the flag PRMV is also cleared and consequently, an advance is made to step 105. At the step 105, the preceding distance measurement starting time TMA and the current distance measurement starting time TMB are stored in a predetermined address in the RAM, and an advance is made to step 106. At TMB, the current time counted by a timer contained in the apparatus is input and therefore, TMB is the current distance measurement starting time, and at TMA, the content of TMB is input and therefore, TMA is the preceding distance measurement starting time. A time TM1 found by the calculation from the distance measurement starting time before the preceding distance measurement starting time to the preceding distance measurement starting time is stored in a predetermined address (step 106), and at the next step 107, the time TM2 from the preceding distance measurement starting time until the current distance measurement starting time is calculated (TMB−TMA), and is stored in a predetermined address. That is, at TM2, the time interval from the preceding distance measurement starting time to the current distance measurement starting time is input, and at TM1, the time interval from the distance measurement starting time before the preceding distance measurement starting time to the preceding distance measurement starting time is input.

The next step 108 is an "image signal input" sub-routine, and by executing this sub-routine, the A/D-converted value of an image signal (signal AOS) obtained in the line sensor device SNS is stored in a predetermined address in the RAM. At step 109, "+1" is effected on the content of the counter COUNT for counting the frequency of distance measurement. At step 110, a "focus detection" sub-routine is executed. In this sub-routine, the focus of the photo-taking lens LNS is detected from the image signal data stored in the RAM at step 108, and the amount of defocus DF is calculated. At step 111, if the amount of defocus DF detected in said "focus detection" sub-routine is greater than a certain value, it is judged that the main object to be photographed has deviated from the distance measuring frame, and an advance is made to step 112, where the content of the counter COUNT is set to "0" to thereby restore the initial state thereof.

On the other hand, if at step 111, it can be judged that the object to be photographed, which is always moving, is within the distance measuring frame, an advance is made to step 113, where the detected amount of defocus is stored in a predetermined address. Here, DF1 in the amount of defocus before the preceding one, DF2 is the preceding amount of defocus, and DF3 is the current amount of defocus. Step 114 is a "lens driving amount calculation" sub-routine, the details of which will be described later. At step 115, the lens driving amount DL obtained at the step 114 is stored in a predetermined address. Here, DL1 is the preceding lens driving amount, and DL2 is the current lens driving amount. Step 116 is a lens driving sub-routine in which a pulse number FP corresponding to the lens driving amount obtained at the step 114 is transmitted to the lens side by communication to thereby execute lens driving. At the next step 117, the flag PRMV indicative of the execution of lens driving is set to "1", whereafter a advance is made to step 118, where the "AF control" sub-routine is returned to. Thereafter, a shift is made to the step 3 of FIG. 3, and when the switch SW1 is ON, the "AF control" sub-routine of step 6 is again called. When the "AF control" is again called in this manner, the state of the flag PRMV is detected at step 102 as previously described. When the lens driving has been effected in the aforementioned "AF control" sub-routine, the flag PRMV is set to "1" at step 117 and therefore, an advance is made to step 103. At the step 103, lens communication is effected to detect the driven situation of the photo-taking lens LNS, and it is detected that a signal indicative of the termination of the predetermined driving indicated at step 116 has been input from the lens FLNS side and at the same time, an advance is made to step 104, where the flag PRMV is set to "0", and the flow of step 5 and subsequent steps is executed. If a signal indicative of the fact that driving is still being done is output from the lens FLNS side, a shift is made to step 119, where the "AF control" sub-routine is returned to. Consequently, steps 3→101→102→103→119 are repeated until the lens driving by the driving amount indicated at step 116 is terminated, and when the movement of the lens by the indicated driving amount is terminated, an advance is made to step 104. Thus, in the "AF control" sub-routine, a new focus detecting operation and lens control are effected only in the state in which the photo-taking lens LNS is not driven. The lens device stops the motor LMTR when the pulse number FP representative of the lens driving amount communicated at step 116 coincides with the pulse number output from the encoder ENC upon driving, whereby the lens driving is terminated and the driving termination signal is transmitted to the camera, and at the step 103, this is detected, and an advance is made to step 104.

Figure 5:
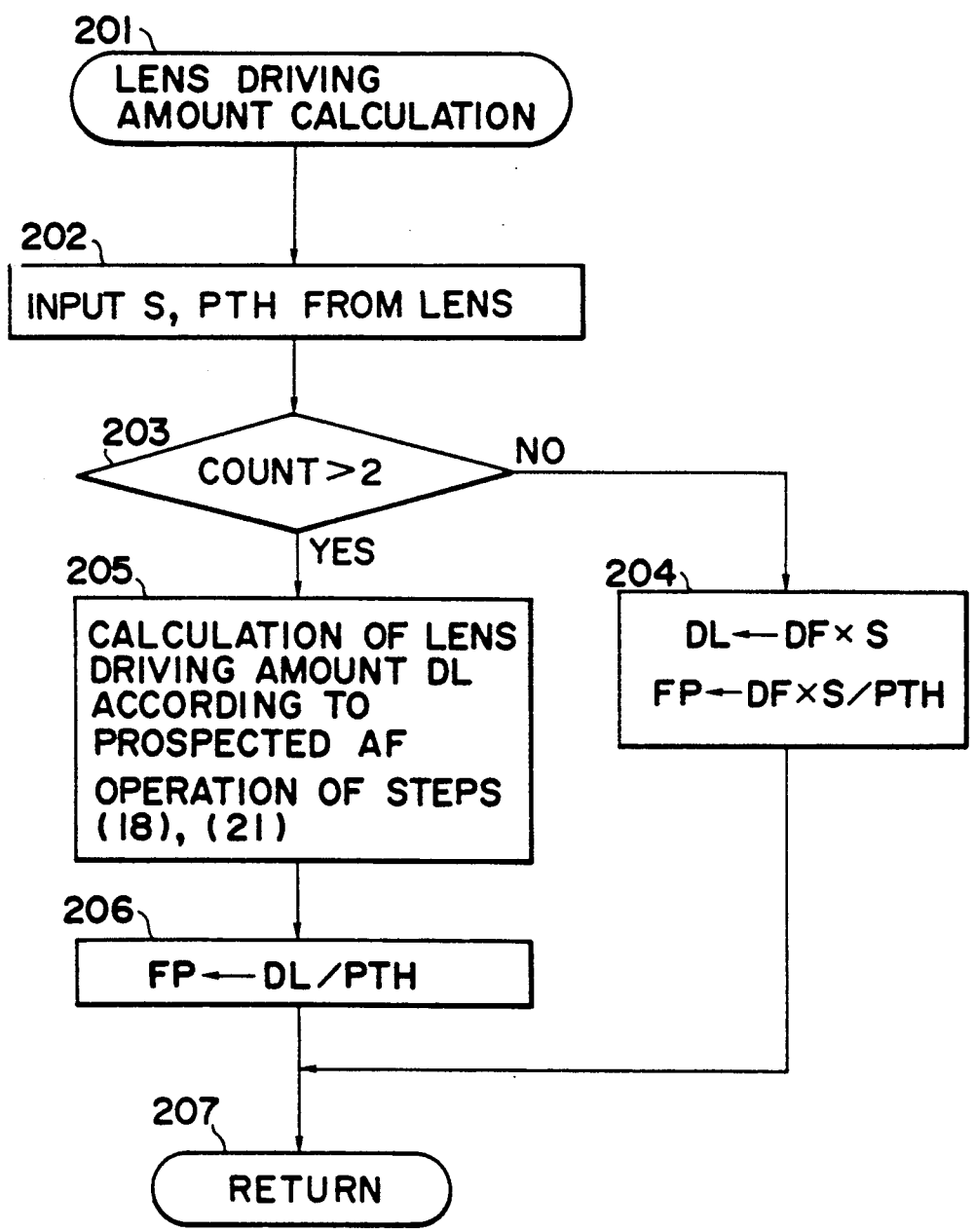
FIG. 5 is also a flow chart showing the "lens driving amount calculation" sub-routine.

The operation in the "lens driving amount calculation" sub-routine effected at the step 114 will now be described with reference to FIG. 5.

When this sub-routine is called, communication is effected with the lens FLNS at step 202 and two data "S" and "PTH" are input. "S" is the coefficient of the "amount of defocus" inherent to the photo-taking lens LNS vs. the "amount of axial movement of the focus adjusting lens, and for example, in the case of a single lens of the totally axially moved type as in the present embodiment, the entire photo-taking lens LNS is a focus adjusting lens and therefore, "S=1", but in the case of a zoom lens, "S" varies depending on the zoom position. Also, "PTH" is the amount of axial movement of the focus adjusting lens per pulse produced by the encoder ENC operatively associated with the movement of the focus adjusting lens (in the present embodiment, the photo-taking lens LNS).

At step 203, whether it is possible to prospect the position at which the lens is focused in the next photography from the content of the counter COUNT for counting the frequency of distance measurement (prospected AF) is judged, and if it is impossible to prospect said position, a shift is made to step 204. Here, by the amount of defocus DF, "S" and "PTH", the amount obtained by converting the amount of axial movement of the focus adjusting lens into the pulse number produced in the encoder ENC, i.e., the so-called lens driving amount FP is found from the following equation:

$$FP = DF \times S/PTH, \quad (3)$$

and the "lens driving amount calculation" sub-routine is returned to.

On the other hand, if at step 203, the data necessary for prospect are accumulated and prospected AF is possible (in the present embodiment, it is judged that prospected AF is possible if the data regarding the past two distance measurements are stored), an advance is made to step 205. The details of the prospected AF system in the present embodiment will be described later. At the step 205, the relation between the imaging plane position of a moving object and time is approximated to a quadratic function (f(t) in FIG. 2).

That is, the relation of the imaging plane position x (f(t)) and time t to the moving object is supposed as the following equation (4), and the coefficients a, b and c of this equation are found from the current and past two amounts of defocus DF1, DF2 and DF3 and the lens driving amounts DL1 and DL2.

$$f(t) = x = at^2 + bt + c \quad (4)$$

$$a = \frac{DF3 + DL2 - DF2}{(TM1 + TM2)TM2} + \frac{DF1 - DL1 - DF2}{(TM1 + TM2)TM1} \quad (5)$$

$$b = \frac{DF2 + DL1 - DF1 - a \times TM1^2}{TM1} \quad (6)$$

$$c = DF1 \quad (7)$$

From the coefficients a, b and c obtained by the aforementioned equations (5)-(7), the next lens driving amount DL is calculated in the following manner:

$$DL = S[a\{(TM1+TM2+TL)^2 - (TM1+TM2)^2\}] + b \times TL + DF3 \quad (8)$$

where TL is the sum of the release time-lag LETL and the AF time-lag AFTL, that is, $$TL = LETL + AFTL \quad (9)$$

It is also possible to substitute TM2 or TM1 as the AF time-lag.

At step 206, the pulse number PF of the encoder ENC corresponding to the lens driving amount DL found from equation (8) is calculated from the following equation:

$$PF = DL/PTH \quad (10)$$

When the previously described operation is executed, the "lens driving amount calculation" sub-routine is returned to.

Figure 2:
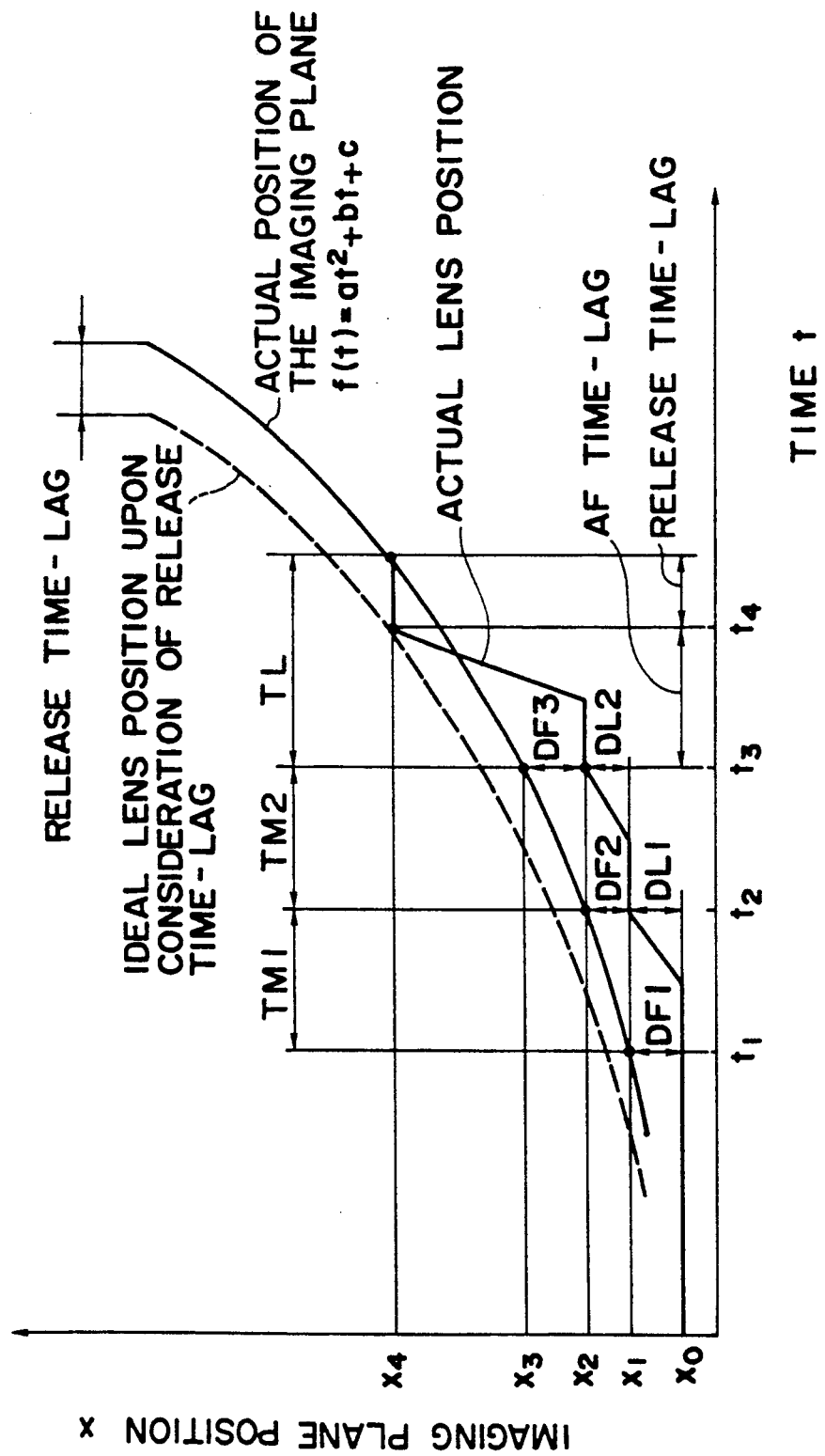
FIG. 2 illustrates a foreseen AF system in a first embodiment of the present invention.

The prospected AF system in the present embodiment will now be described with reference to FIG. 2.

Let is be assumed that the times when distance measurements were effected in the past are $t_1$ and $t_2$, the current time is $t_3$, the amounts of defocus obtained in the distance measurements at the times $t_1$, $t_2$ and $t_3$ are the amounts of defocus DF1, DF2 and DF3, respectively, and the lens driving amounts by which the lens was driven in the past on the basis of the amount of defocus DF1 before the preceding amount of defocus and the preceding amount of defocus DF2 are DL1 and DL2, respectively. From these data, the imaging plane positions $x_1$, $x_2$ and $x_3$ at the times $t_1$, $t_2$ and $t_3$, respectively, can be found. Here, the lens driving amount DL is a value converted into the amount of defocus DF, namely, converted into the imaging plane position. Let it be assumed that $t_1$ is the origin and the then lens position is $X_0$ (the origin). In this case, the imaging plane positions at the respective times are represented by the following equations (11), (12) and (13):

$$t_1 = 0, \quad x_1 = DF1 \tag{11}$$

$$t_2 = TM1 \quad x_2 = DF2 + DL1 \tag{12}$$

$$t_3 = TM1 + TM2, \quad x_3 = DF3 + DL1 + DL2 \tag{13}$$

The respective imaging plane positions represented by equations (11), (12) and (13) are positions obtained by the following equation:

$$x = at^2 + bt + c \tag{14}$$

in which the imaging plane position x and the time t are approximated by a quadratic function, and therefore, if said boundary conditions are substituted into the aforementioned equation (14), the following equations are obtained. That is, in the present invention, the imaging plane position of the moving object is approximated as equation (14) and therefore, the following equations are obtained from the conditions (11)–(13) and equation (14):

$$DF1 = c \tag{15}$$

$$DF2 + DL1 = a \times TM1^2 + b \times TM1c \tag{16}$$

$$DF3 + DL1 + DL2 = a(TM1 + TM2)^2 + b(TM1 + TM2 + c \tag{17}$$

From the above-mentioned equations (15)–(17), a, b and c in equation (14) are found as follows:

$$a = \frac{DF3 + DL2 - DF2}{(TM1 + TM2)TM2} + \frac{DF1 - DL1 - DF2}{(TM1 + TM2)TM1}$$

$$b = \frac{DF2 + DL1 - DF1 - a \times TM1^2}{TM1} \tag{18}$$

$$c = DF1 \tag{19}$$

Here, the imaging plane position $x_4$ in the time TL (=LETL+AFTL) after the time $t_3$ is found from the following equation:

$$x_4 = a(TM1 + TM2 + TL)^2 + b(TM1 + TM2 + TL) + c \tag{20}$$

Consequently, the necessary lens driving amount DL is as follows:

$$\begin{aligned} DL &= x_4 - x_3 + DF3 \\ &= a\{(TM1 + TM2 + TL)^2 - (TM1 + TM2)^2\} + \\ &\quad b \times TL + DF3 \end{aligned} \tag{21}$$

Figure 4:
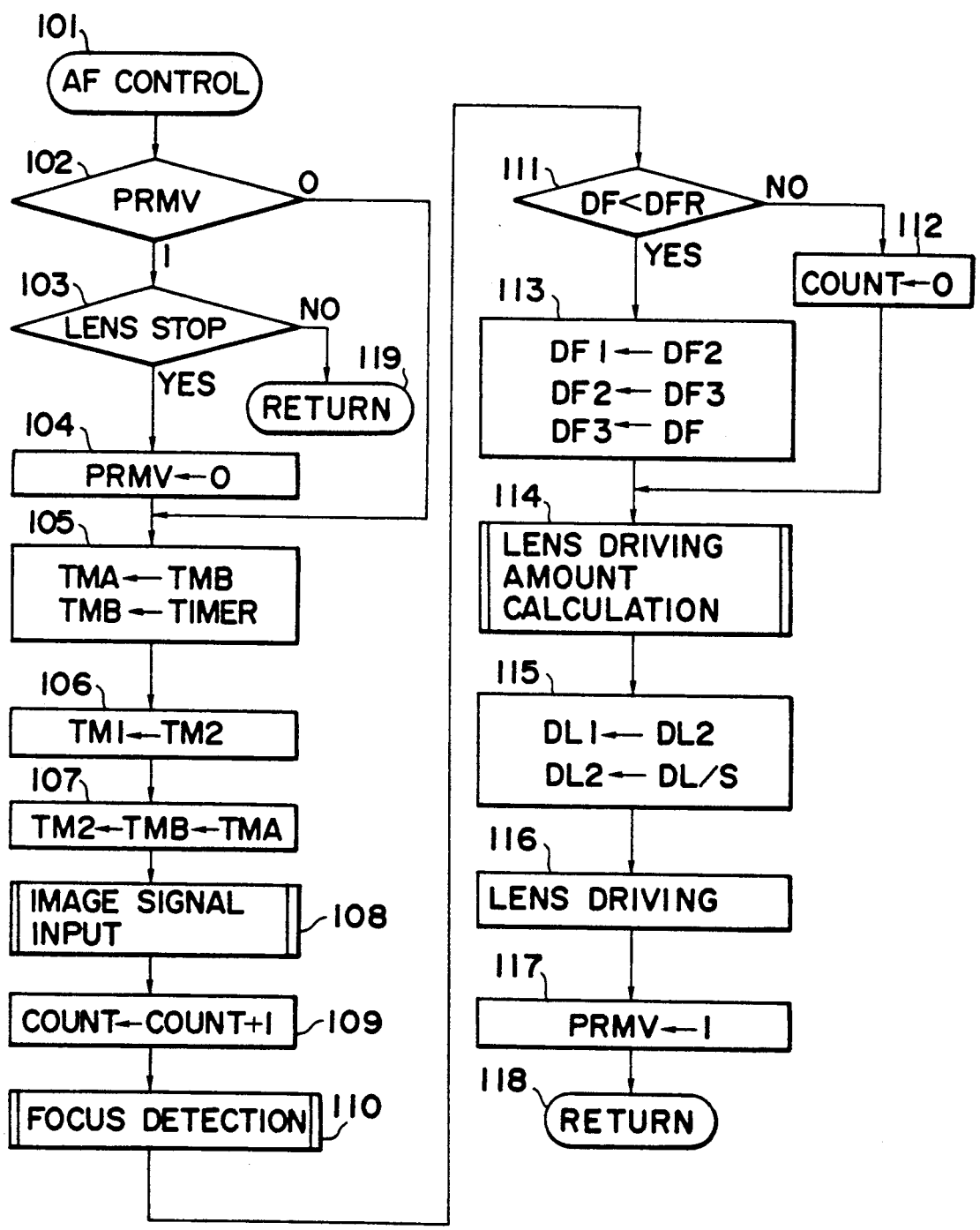
FIG. 4 is a flow chart showing the "AF control" sub-routine shown in FIG. 3.

In equation (21), TM1 and TM2 are the AF time-lag before the preceding AF time-lag and the preceding AF time-lag (with the focus detection and the lens driving time as one cycle, the repetition time interval of this cycle), and the data of TM1 and TM2 are renewed in each AF cycle at the steps 106 and 107 of FIG. 4 and stored in a memory, and the AF time-lag TM1 before the preceding AF time-lag and the preceding AF time-lag TM2 are always held in the memory relative to the current point of time. DF3 is the amount of defocus obtained in the latest distance measurement, and this data is obtained at step 113 each time focus detection is effected at step 110.

TL is the addition value of the release time-lag and the AF time-lag, and the release time-lag is a predetermined time and the preceding time-lag, i.e., TM2 data, is used as the AF time-lag. Consequently, this TL is also a known value.

Also, a and b are shown in equation (18), and DL1 and DL2 in equation (18) are indicative of the lens driving amount before the preceding lens driving amount and the preceding lens driving amount, respectively, and DF1 and DF2 are indicative of the amount of defocus before the preceding amount of defocus and the preceding amount of defocus, respectively. These data are also stored in a memory at steps 115 and 113.

Consequently, at step 205 in the lens driving amount calculation sub-routine of step 114, the calculation of equations (18) and (21) is executed on the basis of the data stored in each of said memories and the prospected lens driving amount DL is found, and the steps subsequent to step 206 are executed on the basis of this DL, whereby the lens is driven in the same manner as the lens driving during the aforementioned usual AF, that is, the lens is driven by the prospected lens driving amount found from equation (21).

Figure 6:
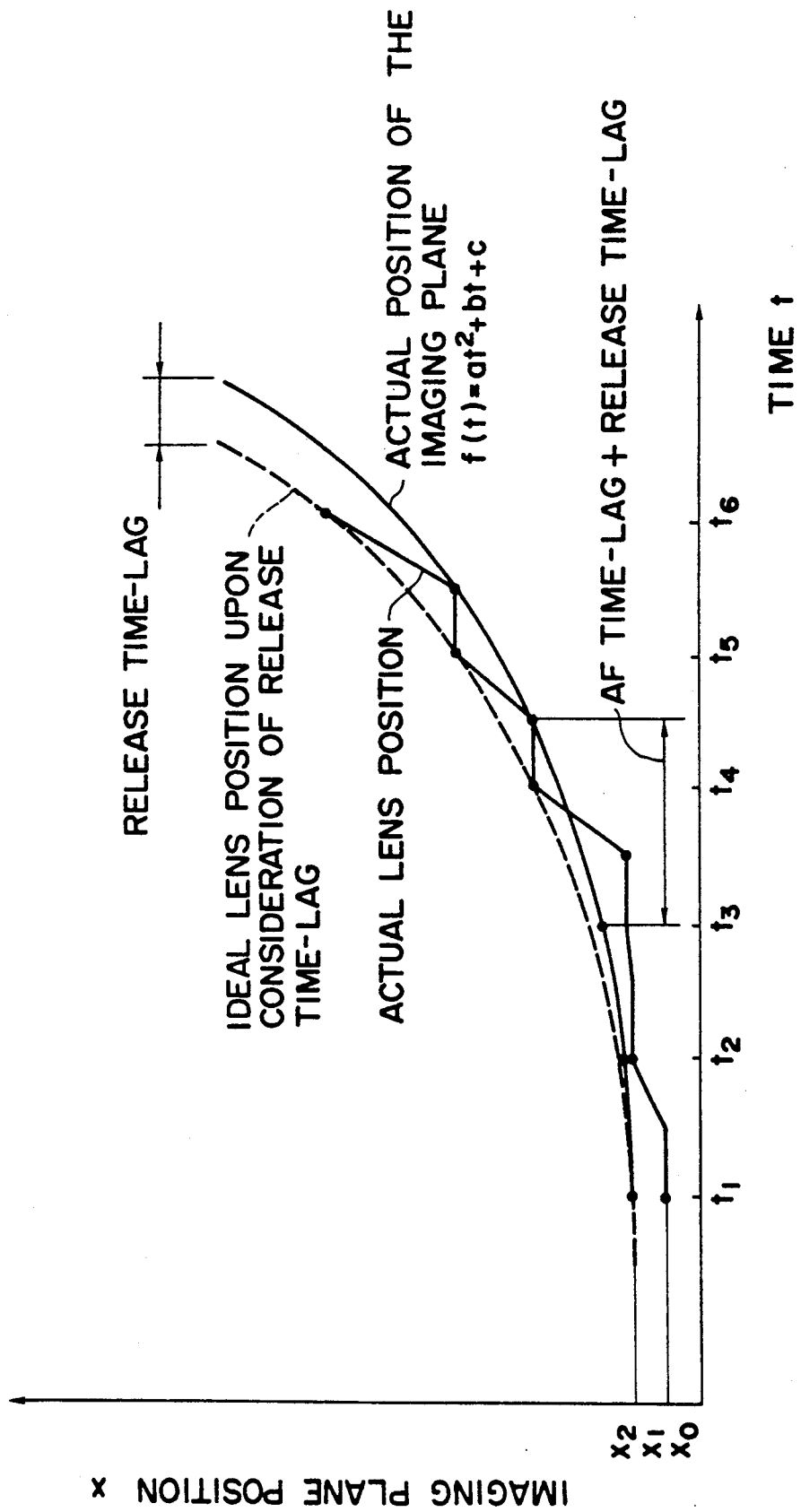
FIG. 6 illustrates the effect of the follow-up compensation in the apparatus according to the embodiment of the present invention.

Consequently, the movement of the photo-taking lens LNS can be controlled as shown in FIG. 6.

By carrying out the lens driving control as described above, it becomes possible to provide a camera provided with an automatic focus adjusting apparatus by which the photo-taking lens LNS can be driven to an ideal position upon consideration of the follow-up delay by the AF time-lag and the release time-lag and in which the movement of the photo-taking lens LNS is stable.

Figure 7:
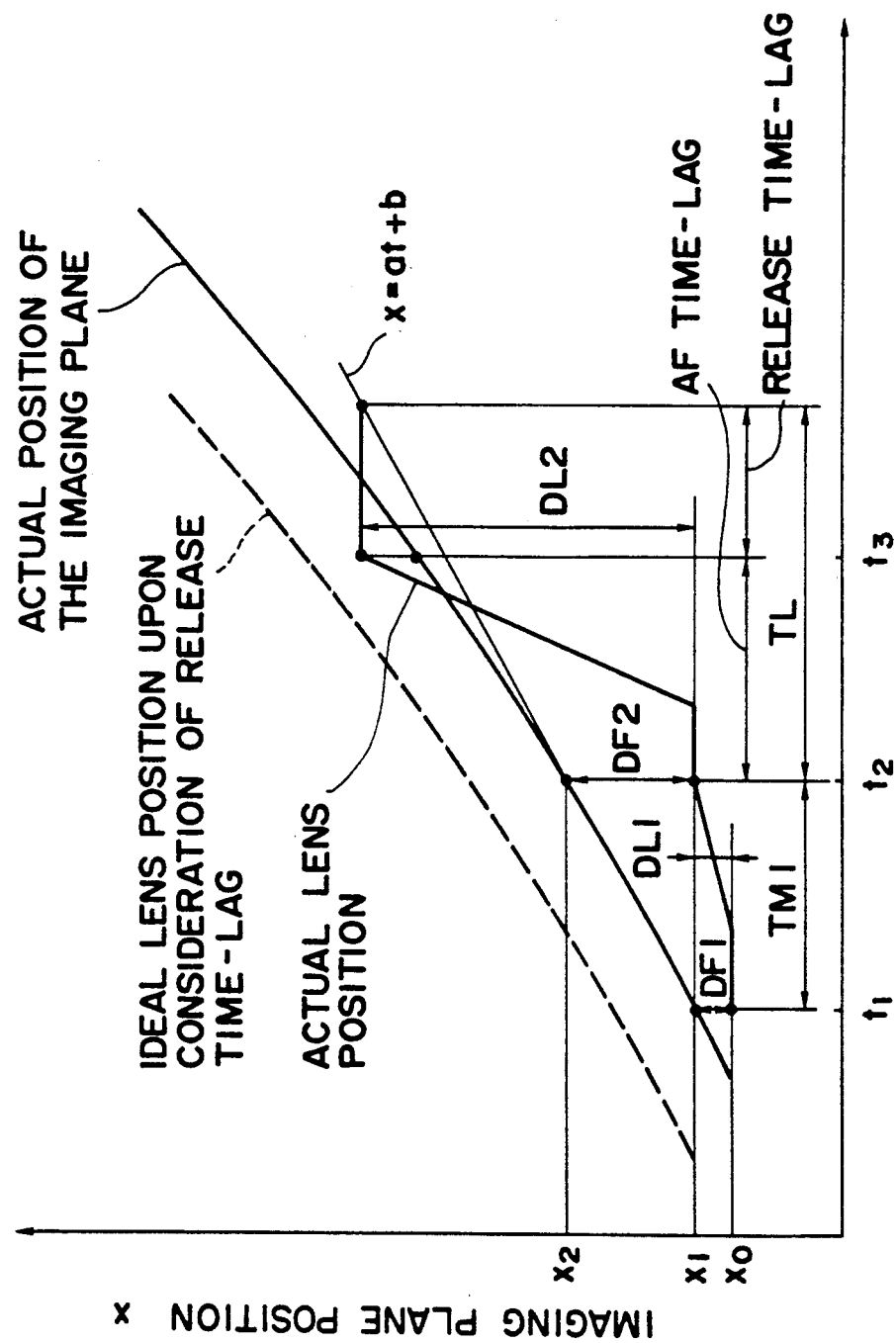
FIG. 7 illustrates a foreseen AF system in a second embodiment of the present invention.

In the above-described embodiment, the function of the imaging plane position and time has been approximated to a quadratic function, but by approximating it to a linear function, calculation can be more simplified. FIG. 7 shows an embodiment in which the function of the imaging plane position x of the moving object and time t is approximated to a linear function $x = at + b$.

First, with ($t_1 = 0$, $x_0 = 0$) as the origin, the function of a straight line passing through ($t_1$, $x_1$) and ($t_2$, $x_2$) is found.

$$t_1 = 0, \quad x_1 = DF1 \tag{22}$$

$$t_2 = TM1, \quad x_2 = DL1 + DF2 \tag{23}$$

Consequently, if said conditions are substituted in the equation ($x = at + b$) of the straight line, $$DF1 = b \quad (24)$$

$$DL1 + DF2 = a \times TM1 + b. \quad (25)$$

Consequently, $$a = \frac{DL1 + DF2 - DF1}{TM1} \quad (26)$$

$$b = DF1 \quad (27)$$

are found, and the position of the photo-taking lens LNS after the time TL upon consideration of a predetermined AF time-lag and the release time-lag to the function is found, and the then lens driving amount DL is as follows:

$$DL = \frac{DL1 + DF2 - DF1}{TM1} \times TL + DF2 \quad (28)$$

Where the approximate equation regarding the imaging plane position and time is thus a linear function, the lens driving amount prospected in equation (28) can be found on the basis of the preceding lens driving amount DL1, the preceding AF time-lag TM1, the preceding and current amounts of defocus DF1 and DF2 and the time-lag TL. In this case, if the calculation of equation (28) is effected at the step 205 of FIG. 5, the lens can be driven approximately to the linear function as shown in FIG. 7.

According to the present embodiment, under a situation in which the distance between the object to be photographed and the camera is changing, the imaging plane position at the time required for the distance measurement effected in the past and the current imaging plane position are calculated from the stored past amount of defocus and lens driving amount and the current amount of defocus, and from these imaging plane positions, the relation between the imaging plane positions and said time is approximated to a quadratic function or a linear function, and the lens position in which the lens is in focus after a predetermined time (the AF time-lag + the release time-lag) is prospected by said function, and the photo-taking lens LNS is moved to this prospected position and therefore, the out-of-focus condition which would otherwise be caused by the time-lag from the start of distance measurement to exposure can be eliminated.

I claim:

1. A focus adjusting apparatus in which a detection of a defocus amount by a focus detection circuit and lens driving according to said defocus amount are repeatedly effected, said apparatus, comprising:
   (a) a data introducing circuit for introducing (1) at least a first defocus amount obtained in a latest focus detection operation and second and third defocus amounts obtained in focus detection operations effected one and two times previous to said latest focus detection operation, and (2) time data representing the actual time at which the focus detection operations were performed;
   (b) a calculation circuit or (1) performing a first calculation to determine coefficients of a functional equation having a power greater than one wherein said equation represents movement of the imaging plane, said coefficients being determined on the basis of said first, second, and third defocus amounts and time data corresponding thereto, and for (2) performing a second calculation in which the imaging plane position or a lens driving amount corresponding to said imaging plane position is determined on the basis of the functional equation, coefficients of which have been determined by said first calculation; and
   (c) a lens driving circuit for driving the lens on the basis of the result of said second calculation.

2. An apparatus according to claim 1, wherein said functional equation is represented by $X = at^2 + bt + c$ where X is the imaging plane position.

3. An apparatus according to claim 1, wherein the imaging plane position or the lens driving amount after expiration of a predetermined period of time is calculated in said second calculation by incorporating therein a time period of a release time lag.

4. A focus adjusting apparatus in which a detection of a defocus amount by a focus detection circuit and lens driving according to said defocus amount are repeatedly effected, said apparatus, comprising:
   (a) a data introducing circuit for introducing (1) at least a first defocus amount obtained in a latest focus detection operation and second and third defocus amounts obtained in focus detection operations effected one and two times previous to said latest focus detection operation, and (2) time data representing the actual time at which the focus detection operations were performed;
   (b) a calculation circuit for performing a first calculation in which coefficients a, b of a formula $X = at^2 + bt + c$ representing the movement of the imaging plane are determined on the basis of said three defocus amounts and time data, and for performing a second of calculation in which X representing the imaging plane after a predetermined period of time or a lens driving amount corresponding to said X is determined by substituting a,b obtained in said first calculation in said formula; and
   (c) a lens driving circuit for driving the lens on the basis of the result of said second calculation.

5. An apparatus according to claim 4, wherein the imaging plane position or the lens driving amount after a predetermined period of time is calculated in said second calculation by incorporating therein a time period of a release time lag.

6. A focus adjusting apparatus in which detection of a defocus amount by a focus detection circuit and lens driving according to said defocus amount are repeatedly effected, said apparatus, comprising:
   (a) a data circuit for determining first, second, and third defocus amounts obtained in focus detection operations performed at three different times, said three defocus amounts including at least two defocus amounts obtained in focus detection operations performed in the past;
   (b) a calculation circuit for performing a first calculation to determine coefficients of a higher-order functional equation representing a movement of the imaging plane on the basis of said first, second, and third defocus amounts and time data corresponding thereto, and for performing a second calculation in which the imaging plane position or a lens driving amount corresponding to said imaging plane position is determined on the basis of the higher-order functional equation, the coefficients of which have been determined in said first calculation; and (c) a lens driving circuit for driving the lens on the basis of the result of said second calculation.

7. A focus adjusting apparatus in which a detection of a defocus amount by a focus detection circuit and lens driving according to said focus amount are repeatedly effected, said apparatus, comprising:

(a) a data circuit for detecting data obtained in a focus detecting operation performed in the past, the data detected by said data circuit being renewed whenever the focus detection operation is performed, a predetermined number of the latest focus adjusting data including the present data being input to said data circuit;

(b) a calculation circuit fox calculating an imaging plane position a lens driving amount corresponding to said imaging plane position after expiration of a predetermined period of time on the basis of the data obtained by said data circuit, said calculation being performed whenever said data are renewed, and said predetermined time including a release time lag; and (c) a lens driving circuit for driving the lens on the basis of the calculation performed by said calculation circuit.

8. A focus adjusting device according to claim 7, wherein said data obtained in said focus detecting operation is a defocus amount obtained by said focus detection circuit.

9. A focus adjusting device according to claim 7, wherein said release time lag is a time period from a releasing operation to the opening of a shutter member.

10. A focus adjusting apparatus in which a detection of a defocus amount by a focus detection circuit and lens driving according to said defocus amount are repeatedly effected, said apparatus, comprising;

(a) a data circuit for repeatedly detecting focus adjusting data obtained in the past by said focus detection circuit;

(b) a calculation circuit for calculating an imaging plane position or a lens driving amount corresponding to said imaging plane position at a time after a predetermined period of time including a release time lag has passed on the basis of the data obtained by said data circuit, said calculation circuit repeatedly obtaining data of said imaging plane position or lens driving amount for an object in the future after expiration of a predetermined period of time including the release time lag; and (c) a lens driving circuit for driving the lens on the basis of the result of the calculation performed by said calculation circuit.

11. A focus adjusting device according to claim 10, wherein said data obtained in said focus detecting operation is a defocus amount obtained by said focus detection circuit.

12. A focus adjusting device according to claim 10, wherein said release time lag is a time period from a releasing operation to the opening of a shutter member.

13. A camera including a focus adjusting apparatus in which detection of a defocus amount by a focus detection circuit and lens driving according to the detected defocus amount are repeatedly effected, said camera comprising:

(a) a data circuit for determining at least first, second, and third defocus amounts obtained in focus detection operations performed at three different times;

(b) a calculation circuit for performing a calculation to determine an imaging plane position or a lens driving amount on the basis of a higher-order functional equation, wherein coefficients of said higher-order functional equation are determined on the basis of said first, second, and third defocus amounts; and (c) a lens driving circuit for driving the lens on the basis of the result of said calculation.

14. A camera including a focus adjusting apparatus in which a detection of a defocus amount by a focus detection circuit and lens driving according to the detected defocus amount are repeatedly effected, said camera comprising:

(a) a data circuit for repeatedly detecting focus adjusting data obtained in the past by said focus detection circuit;

(b) a calculation circuit for calculating an imaging plane position or a lens driving amount corresponding to said imaging plane position at a time after a predetermined period of time including a release time lag has passed on the basis of the data obtained by said data circuit, said calculation circuit repeatedly obtaining data of said imaging plane position or lens driving amount for an object in the future after expiration of a predetermined period of time including the release time lag; and (c) a lens driving circuit for driving the lens on the basis of the result of the calculation performed by said calculation circuit.

* * * * *

UNITED STATES PATENT AND TRADEMARK OFFICE
CERTIFICATE OF CORRECTION

PATENT NO. : 5,012,267             Page 1 of 2
DATED      : April 30, 1991
INVENTOR(S): Masaki Higashihara It is certified that error appears in the above-identified patent and that said Letters Patent is hereby corrected as shown below:

COLUMN 7:

Line 12, "a" should read --an--.

COLUMN 9:

Line 1, "is" should read --it--.

Line 22, "$t_2$ = TM1" should read --$t_2$ = TM1,--.

Line 44, "DF2 + DL1 = a x $TM1^2$ + b x TM1c   (16)"
should read --DF2 + DL1 = a x $TM1^2$ + b x TM1 + c   (16)--.

COLUMN 11:

Line 56, "apparatus," should read --apparatus--.

Line 65, "or" should read --for--.

COLUMN 12:

Line 23, "apparatus," should read --apparatus--.

Line 37, "of" should be deleted.

UNITED STATES PATENT AND TRADEMARK OFFICE
CERTIFICATE OF CORRECTION

PATENT NO. : 5,012,267

DATED : April 30, 1991

INVENTOR(S) : Masaki Higashihara

It is certified that error appears in the above-identified patent and that said Letters Patent is hereby corrected as shown below:

Line 54, "apparatus," should read --apparatus--.

COLUMN 13:

Line 10, "apparatus," should read --apparatus--.

Line 18, "fox" should read --for--.

Line 19, "position a" should read --position or a--.

Line 40, "apparatus," should read --apparatus--.

Signed and Sealed this

Fifteenth Day of December, 1992

*Attest:*

DOUGLAS B. COMER

*Attesting Officer*    *Acting Commissioner of Patents and Trademarks*